US012331474B2

(12) United States Patent
Nero (10) Patent No.: US 12,331,474 B2
(45) Date of Patent: Jun. 17, 2025

(54) WATER BARRIER SYSTEM COMPRISING CONNECTION DEVICE

(71) Applicant: INERO AB, Månsarp (SE)

(72) Inventor: Ingvar Nero, Månsarp (SE)

(73) Assignee: INERO AB, Månsarp (SE)

( * ) Notice: Subject to any disclaimer, the term of this patent is extended or adjusted under 35 U.S.C. 154(b) by 176 days.

(21) Appl. No.: 18/093,777

(22) Filed: Jan. 5, 2023

(65) Prior Publication Data

US 2023/0323619 A1    Oct. 12, 2023

(30) Foreign Application Priority Data

Apr. 8, 2022    (EP) .................................. 22167280

(51) Int. Cl.
*E02B 3/10*    (2006.01)
(52) U.S. Cl.
CPC .................................. *E02B 3/106* (2013.01)
(58) Field of Classification Search
CPC ..... E02B 3/106; F16B 21/02; E06B 2009/007
See application file for complete search history.

(56) References Cited

U.S. PATENT DOCUMENTS 5,364,150 A * 11/1994 Cochran ................. B60R 13/01
24/297
5,897,278 A *  4/1999 Frattarola ............... F16B 21/02
411/549

(Continued)

FOREIGN PATENT DOCUMENTS

DE        20016969 U1     4/2001
EP        2257675 A1     12/2010
(Continued)

OTHER PUBLICATIONS

Extended European Search Report for European Application No. 22167280.1, mailed Oct. 7, 2022, (8 pages).

(Continued)

*Primary Examiner* — Carib A Oquendo
(74) *Attorney, Agent, or Firm* — Kagan Binder, PLLC (57) ABSTRACT

The present invention relates to a water barrier module system comprising a first (10) and a second (20) protective module configured to form at least a part of a water barrier. Each protective module comprises a side flange (12, 22) extending substantially perpendicular to a main plane and having an outer surface (18, 28) and an inner surface (16, 26). Each of the side flanges comprises at least one elongated opening (14, 24) having a width (W2) and a length (L2), wherein the length is larger than the width. A connection device (30) is configured to, in a connecting position, connect the side flanges (12, 22) by extending through the elongated openings when the outer surfaces of the two side flanges are arranged to each other. The connection device (30) comprises a first portion (31) configured to abut the inner surface of the first side flange, and a second portion (32) configured to abut the inner surface of the second side flange. The first portion (31) of the connection device has a width (W3) that is smaller or equal to the width (W2) of the elongated openings (14, 24) and a length (L3) that is larger than the width (W2) of the elongated openings and smaller than or equal to the length (L2) of the elongated openings.

13 Claims, 5 Drawing Sheets

(56) References Cited

U.S. PATENT DOCUMENTS

| | | | |
|---|---|---|---|
| 6,237,970 B1 | 5/2001 | Joannou | |
| 6,840,711 B1 | 1/2005 | Martinez et al. | |
| 7,517,117 B2 * | 4/2009 | Moreland | F16B 21/02 362/396 |
| 2007/0172336 A1 | 7/2007 | Hsu | |
| 2010/0329785 A1 * | 12/2010 | Nero | E02B 3/106 405/16 |
| 2019/0112772 A1 | 4/2019 | Steinhardt et al. | |

FOREIGN PATENT DOCUMENTS

| | | | |
|---|---|---|---|
| FR | 2199363 A5 | 4/1974 |
| FR | 2721074 A1 | 12/1995 |
| WO | 2009103429 A1 | 8/2009 |

OTHER PUBLICATIONS

E-Space net machine translation for DE20016969U1.
E-Space net machine translation for FR2199363A5.
E-Space net English Abstract and machine translation for FR2721074A1.

* cited by examiner

WATER BARRIER SYSTEM COMPRISING CONNECTION DEVICE

TECHNICAL FIELD

The present disclosure relates to a water barrier module system, and especially to a water barrier module system comprising a connection device to connect protective modules.

BACKGROUND

When assembling protective modules of a water protection barrier, for example in flooded areas, it is essential that the assembly work can be carried out swiftly and smoothly in order to minimize the damage that the water may cause. It is also important that the barrier, besides allowing rapid assembly, is robust and impact resistant.

EP2257675 discloses a water barrier in which protective modules arranged next to each other are easily connected to each other. To such modules, at an upper edge, extension modules may be arranged to extend the height of the water barrier. However, for such extension modules, the same connection technique as between modules arranged side by side may in some situations not be desired. It may for instance be due to strength requirements. Instead, such extension modules are commonly attached to a protective module by means of screws and nuts.

Compared with currently available alternatives, there is a need for a water barrier module system which is designed such that a barrier can be rapidly, smoothly and safely formed when assembling for instance an extension module to a protective module.

SUMMARY

It is an object of the present invention to provide an improved solution that alleviates the mentioned drawbacks with present devices. Furthermore, it is an object to provide a water barrier module system comprising an alternative attachment solution between protective modules.

The invention is defined by the appended independent claims, with embodiments being set forth in the appended dependent claims, in the following description and in the drawings.

According to a first aspect of the invention a water barrier module system is provided comprising a first protective module and a second protective module configured to form at least a part of a water barrier to be positioned between a body of water and an area to be protected from water. Each of the protective modules comprises a main plane and a first side along at least one side of the main plane. The first protective module comprises a first side flange along the first side of the first protective module, the first side flange extending substantially perpendicular to the main plane and having an outer surface and an inner surface. The second protective module comprises a second side flange along the first side of the second protective module, the second side flange extending substantially perpendicular to the main plane and having an outer surface and an inner surface. Each of the first and second side flanges comprises at least one elongated opening having a width and a length, wherein the length is larger than the width. The water barrier module system further comprises a connection device configured to, in a connecting position, connect the first side flange to the second side flange by extending through the at least one elongated opening of both side flanges when the outer surfaces of the two side flanges are arranged to each other. The connection device comprises a first portion configured to, in the connecting position, abut the inner surface of the first side flange, a second portion configured to, in the connecting position, abut the inner surface of the second side flange, and an intermediate portion connecting the first portion and the second portion and configured to, in the connecting position, extend through the elongated openings. The first, second and intermediate portions of the connection device are formed in one integrated unit fixed relative to each other. The first portion of the connection device has a width that is smaller or equal to the width of the elongated openings and a length that is larger than the width of the elongated openings and smaller than or equal to the length of the elongated openings.

By means of the connection device, the two protective modules may be attached to each other in an easy and rapid manner. Further, the connection device may have a form that is cost efficient to produce, making the whole solution of the water barrier module system cost efficient.

The first protective module may have side flanges at further sides than the first side flange at the first side. The first protective module may be a protective module of the water barrier configured to be placed on a ground for protection against a body of water. The second protective module may be a protective module of the water barrier configured to be placed on the ground next to the first protective module. Alternatively, the second protective module may be configured to be arranged on top of the first protective module. The first sides of the two protective module may be sides facing each other when the two protective modules are arranged to form a water barrier or a part of a water barrier. The main plane of each of the protective modules may be the main surface of the water barrier, facing the body of water when in use as a water barrier. The side flanges of the protective modules may extend perpendicular to the respective main planes of the protective modules. The angles of the side flanges to the main planes may provide that the outer surfaces of the side flanges becomes in contact and facing each other when the two protective modules are arranged to each other. The outer surface of a side flange may be facing away from protective module and the main plane. The inner surface of a side flange may be facing towards a back side of the protective module, which may be a back side of the main plane.

The connection device may further be configured to be arranged in an inserting position. When in the inserting position, the first portion of the connection device may extend through the elongated openings of the two side flanges via the intermediate portion. The first and second portions may then be positioned at opposite sides of the elongated openings. Due to the width of the first portion being equal or smaller than the width of the elongated openings, and the length of the first portion being equal or smaller than the length of the elongated openings, the first portion may be moved through the elongated openings.

In the connecting position, the connection device may provide the two side flanges, and thereby the two protective modules, to be fixed to each other. To reach to the connecting position, the connection device may be moved, for instance rotated, from the inserting position to the connecting position. In one embodiment, the connection device may be rotated about 45-135 degrees, preferably about 60-120 degrees, about 80-100 degrees or about 90 degrees from the inserting position to the connecting position to fix the two side flanges to each other. The inserting position may be the position the connection device may be in after at least the first portion has been moved through the elongated openings. After being moved to the inserting position, i.e. when the first portion has been moved through the elongated openings and the intermediate portion extends through the elongated openings, the connection device may be rotated into the connecting position, thereby achieving the connection of the two side flanges to each other. Since the connection device is formed as one integrated unit, the whole connection device may be rotated into the connecting position to achieve the fixation. This may further be provided by the distance between the first and second portions, i.e. the length of the intermediate portion, may correspond to the combined thickness of the two side flanges. Since the connection device is formed as one integrated unit, any movement of the connection device to the connecting position may be provided by the whole connection device being moved. When being moved from the inserting position to the connecting position, the whole connection device, including the first, second and intermediate portions formed in an integrated unit, may be moved as one unit.

The first portion of the connection device may provide a surface thereof configured to abut the inner surface of the first side flange when in the connecting position. The second portion of the connection device may provide a surface thereof configured to abut the inner surface of the second side flange when in the connecting position. Said two surfaces of the respective portions may face each other. Said two surfaces of the respective portions may be distanced by the length of the intermediate portion.

The at least one elongated opening of the first side flange and the at least one elongated opening of the second side flange may be identically shaped, or at least similar in size. When referring to the width and/or length of a portion of the connection device being smaller or larger than the width or length of the elongated openings, it may be meant that the width and/or length of a portion of the connection device is smaller or larger than an elongated opening of at least one of the side flanges. Further, the relationships between the sizes of the first and second portions and the elongated openings may be provided such that the width of the first portion is smaller than or equal to the width of the elongated opening on at least the side flange which it is intended to abut in the connecting position, and the length is larger than the width than the elongated opening on at least the same side flange. Further, in one embodiment, the second portion may have a length that is larger than the width of the elongated opening on at least the side flange which it is intended to abut in the connecting position. The elongated openings may be elliptical or rectangular with sharp, angular or rounded corners and/or short sides.

The connection device may be made of a material strong enough to handle the forces that the connection of the side flanges may be exposed to. Such material may e.g. be metal or plastics.

In one embodiment, the first portion and the second portion of the connection device may extend in parallel. The first and second portions may have respective surfaces configured to abut the inner surfaces of the respective side flanges when in the connecting position. Said surfaces of the two portions may extend in parallel. The connection device may thereby be easily moved to the connecting position, which movement causes the two side flanges to be fixed to each other.

In one embodiment, the first portion and the second portion of the connection device may be separated by the intermediate portion providing a distance between the first and second portions being substantial equal to a combined thickness of the first and second side flanges. The material thickness of the two side flanges may provide a distance between the respective inner surfaces of the two side flanges to which the first and second portions of the connection device are configured to abut. Since the distance between the first and second portions may correspond to the thickness of the two side flanges together, the two side flanges may be clamped between the first and second portions when in the connecting position.

In one embodiment, the second portion may have a length that is larger than the width of the elongated openings. When moving the connection device from the inserting position to the connecting position, the length of the first portion may provide that the first portion in the connecting position extend across and beyond the width of the elongated openings. On the other side of the side flanges, the second portion may, when having a length that is larger than the width of the elongated openings, correspondingly extend across and beyond the width of the elongated openings. The clamping of the side flanges between the first and second portions in the connecting position may thereby be facilitated.

In one embodiment, the length of the second portion may be larger than the length of the elongated openings. In the inserting position, the second portion may stay at the side of the side flanges that the connection device was inserted into the elongated openings from. The second portion may in such embodiment not be moved through any elongated opening. The length of the second portion may thereby be larger than the length of the elongated openings. The second portion may be sized and shaped such that it cannot be moved through the elongated openings. The length of the second portion may be larger than both the width and the length of the elongated openings. The length of the second portion may extend such as to form a handle portion for a user to use when moving the connection device from the inserting position to the connecting position.

In one embodiment, the width of the second portion may be smaller than the width of the elongated openings. All portions of the connection device may have the same width. The connection device may thereby be easily manufactured from a single piece of material.

In an alternative embodiment, the width of the second portion may be larger than the width of the elongated openings. Since the second portion may not be intended to move through the elongated openings when the connection device is moved to the inserting position and/or connecting position, the second portion may in one embodiment have a larger width and/or length than the width of the elongated openings.

In one embodiment, the second protective module may be an extension module extending the height of the water barrier. The first protective module may be configured to be arranged on the ground to provide a main barrier surface against a body of water. The second protective module may thereby extend the height of the water barrier, providing a barrier capable of facing a deeper body of water. In one embodiment, depending on the orientation of the connection device when arranged to the protective modules, the second protective module may be configured to be arranged on the ground, and the first protective module may be an extension module.

In an alternative embodiment, the first protective module may be a ground protective module, and the second protective module may be an additional protective module arranged next to the first protective module. The side flanges may be arranged at sides of the two protective modules facing each other, and the connection device may be provided to fix the two ground protective modules to each other.

In one embodiment, the water barrier module system may comprise two or more connection devices to be arranged to the first and second side flanges to fix the first and second protective modules to each other.

In one embodiment, the first portion, the second portion and the intermediate portion of the connection device may together have a uniform width. The whole connection device may have a uniform width.

In one embodiment, the connection device may be formed of a sheet material, wherein the thickness of the sheet material provides the widths of the portions of the connection device. The sheet material may be a metal sheet material, such as steel or aluminum. The connection device may be formed as a cut-out piece of the sheet material. The sheet material may have a uniform thickness, which may provide that the whole connection device may have a uniform width.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
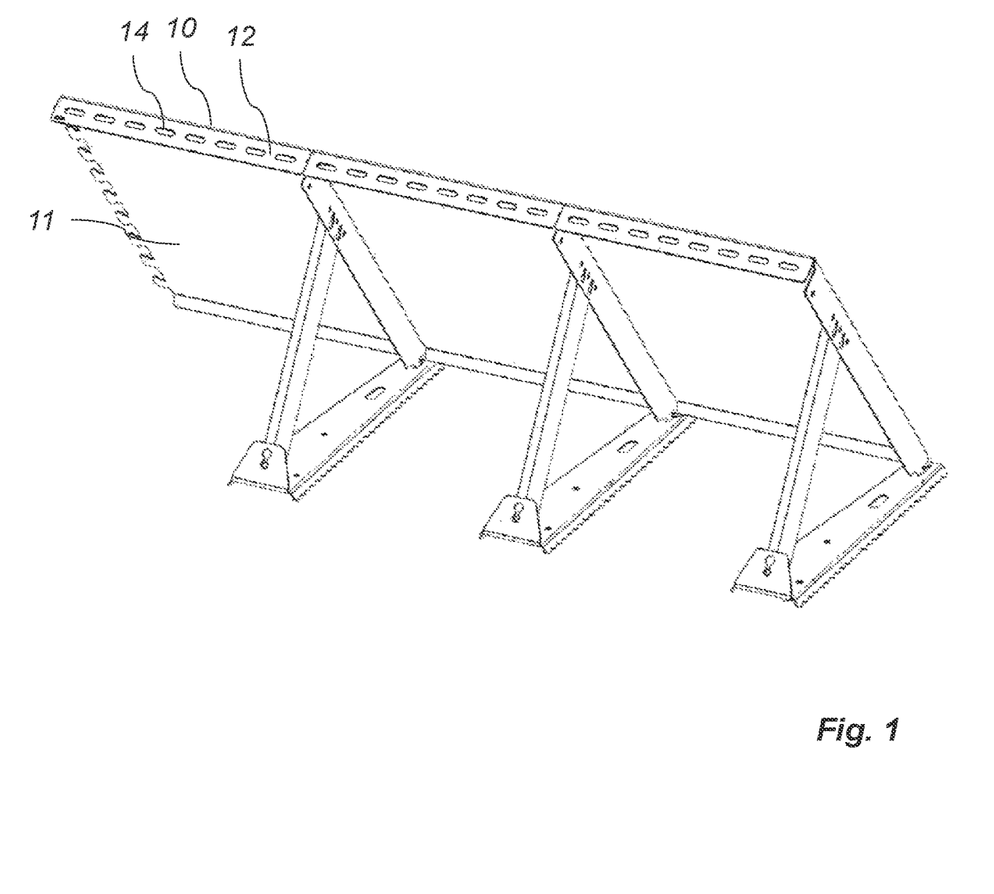
FIG. 1 shows a perspective view of first protective modules according to an embodiment of the invention.

FIG. 1 illustrates a part of a water barrier module system 1 according to an embodiment. A plurality of first protective modules 10 are arranged side by side to form a water barrier. The first protective module 10 comprises a main plane 11 providing the main barrier surface of the water barrier. The first protective module 10 further comprises a first side flange 12 extending along a side of the main plane 11. The first side flange 12 extends substantially perpendicular to the main plane 11. The first side flange 12 comprises a plurality of openings 14. The openings 14 are elongated and extends in a row.

Figure 2:
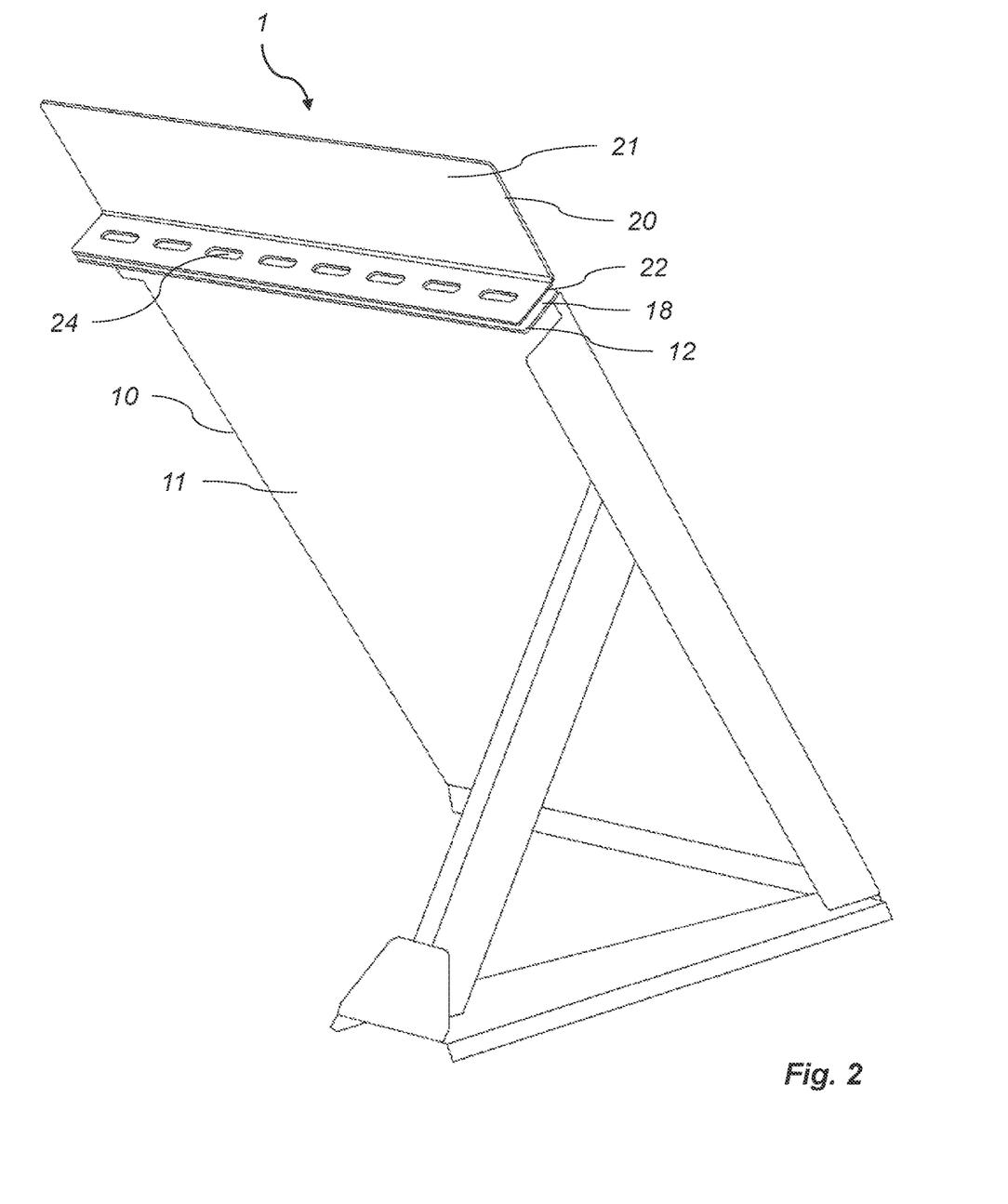
FIG. 2 shows a perspective view of a water barrier module system according to an embodiment of the invention.

FIG. 2 illustrates the first protective module 10 with a second protective module 20 arranged on top. The second protective module 20 is in the illustrated embodiment an extension module increasing the height of the water barrier. The second protective module 20 comprises a main plane 21 extending, when the second protective module 20 is arranged to the first protective module 10, in the same plane as the main plane 11 of the first protective module 10. The second protective module 20 comprises a second side flange 22 extending along a side of the main plane 21. The second side flange 22 extends substantially perpendicular to the main plane 21. The second side flange 22 comprises a plurality of openings 24. The openings 24 are elongated and extends in a row.

Figure 3:
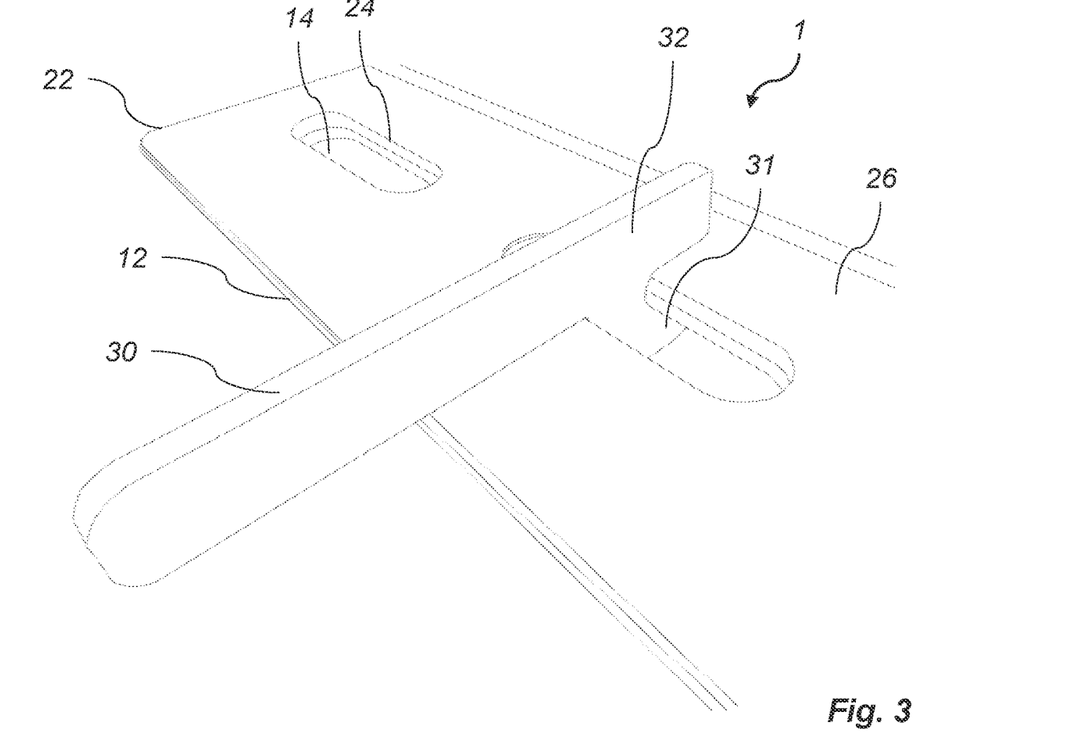
FIG. 3 shows a perspective detail view of a water barrier module system according to an embodiment of the invention.

When the first and second side flanges 12, 22 are arranged to each other, as illustrated in e.g. FIGS. 2 and 3, the elongated openings 14, 24 of the two side flanges 12, 22 coincide. The elongated openings 14, 24 of the two side flanges 12, 22 are equal in size and shape. Each elongated opening 14, 24 has a width W2 and a length L2. The length L2 is longer than the width W2. This is further illustrated in FIGS. 6a-b.

Figures 4, 5:
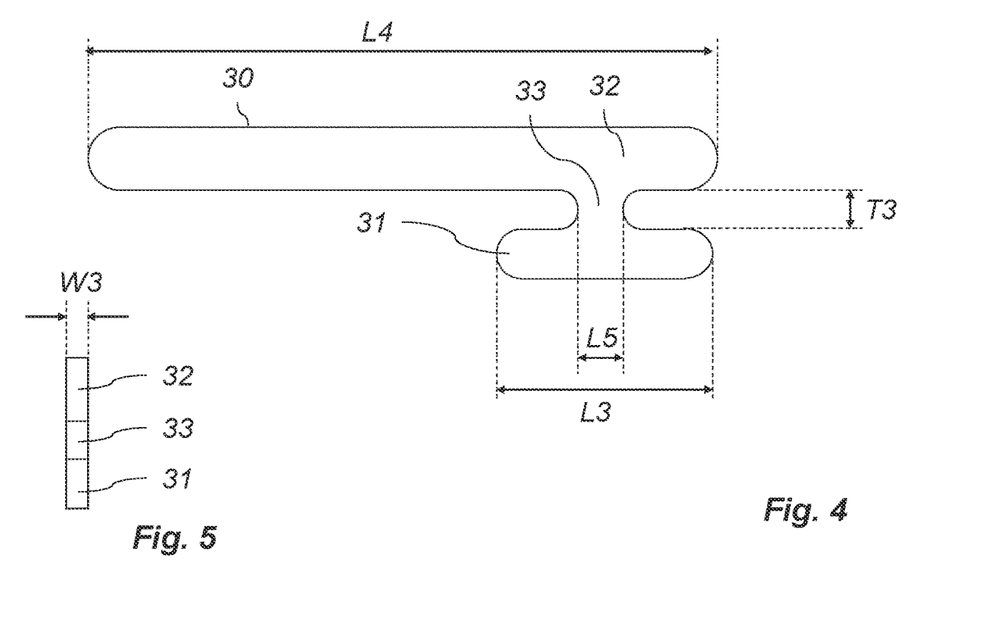
FIG. 4 shows a side view of a connection device according to an embodiment of the invention.
FIG. 5 shows a side view of a connection device according to an embodiment of the invention.

The two side flanges 12, 22, and thereby also the two protective modules 10, 20, are fixed to each other by means of one or more connection devices 30. FIG. 4 illustrates the connection device 30 from the side, having a first portion 31, a second portion 32, and an intermediate portion 33 connecting the first and second portions 31, 32 to each other. The connection device 30 may be formed as one integrated unit. The first and second portions 31, 32 extend in parallel, separated by a distance T3 provided by the intermediate portion 33.

The first portion 31 has a length L3. The length L3 is smaller or equal to the length L2 of the elongated openings 14, 24. FIG. 5 further illustrates the connection device 30 from the side, showing the width W3 of the connection device 31. In the illustrated embodiment the entire connection device 30 has the same width W3. In an alternative embodiment, different portions of the connection device 30 may have different width, such that the first portion has the width W3, and the intermediate portion 33 and/or the second portion 32 has a differing width. The width W3 is equal or smaller than the width W2 of the elongated openings 14, 24.

Further, the length L3 of the first portion of the connection device 30 is larger than the width W2 of the elongated openings 14, 24. The second portion 32 may further have a length L4 which is larger than the width W2 of the elongated openings 14, 24. Optionally, as illustrated, the length L4 may further be larger than the length L2 of the elongated openings 14, 24.

The intermediate portion 33 has a length L5 that is smaller or equal to the width W2 of the elongated openings 14, 24. If the length L5 is substantially equal to the width W2, an improved stability in the fixation between the side flanges 12, 22 when the connection device 30 is in the connecting position may be provided.

Figure 6A:
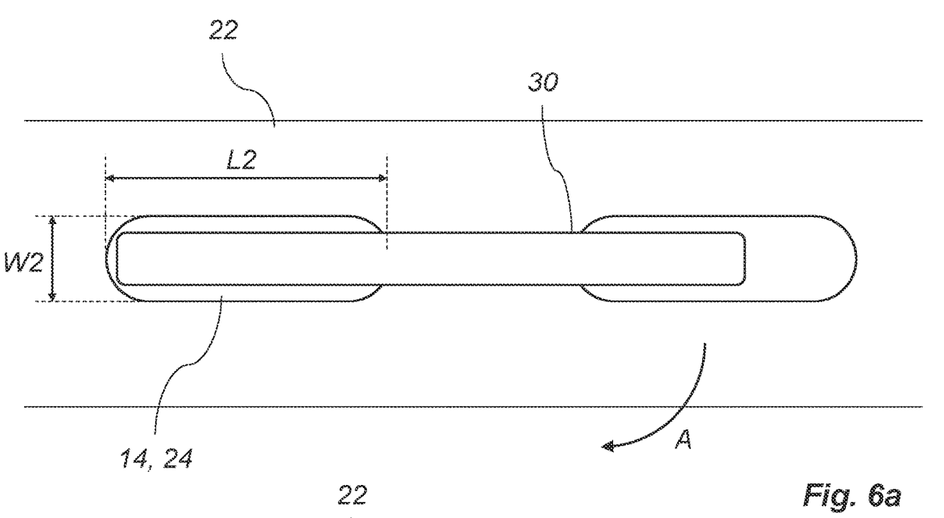
FIG. 6a shows a top view of a water barrier module system according to an embodiment of the invention.
Figure 6B:
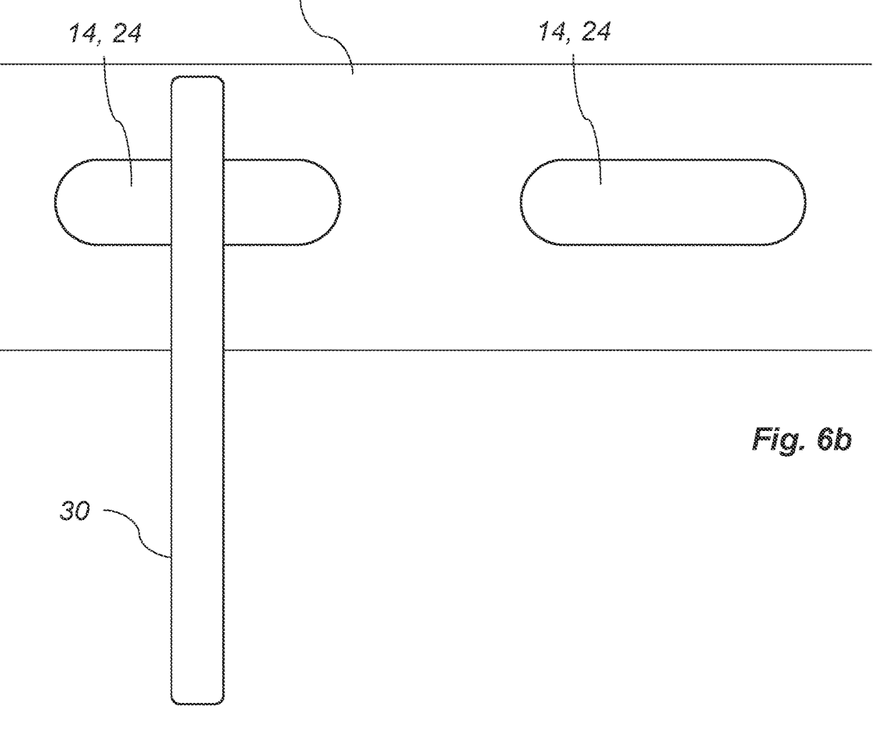
FIG. 6b shows a top view of a water barrier module system according to an embodiment of the invention.

FIGS. 6a and 6b illustrate the connection device 30 being in two different positions. In FIG. 6a the connection device 30 is in an inserting position wherein the first portion 31 extends, via the intermediate portion 33, through the elongated openings 14, 24. The length L3 of the first portion 31 being smaller or equal to the length L2 of the elongated openings 14, 24, and the width W3 of the first portion 31 being smaller or equal to the width of the elongated openings 14, 24, provides that the first portion 31 may be inserted through the elongated openings 14, 24. The first and second portions 31, 32 are thereby located at opposite sides of the side flanges 12, 22.

FIG. 6b illustrates the connection device 30 in a connecting position. From the inserting position the connection device 30 is rotated about 90 degrees in direction A to the connecting position. The length L3 of the first portion 31 being larger than the width W2 of the elongated openings 14, 24 thereby provides that the connection device 30 is fixed in the connecting position and locks the two side flanges 12, 22 to each other.

Figure 7:
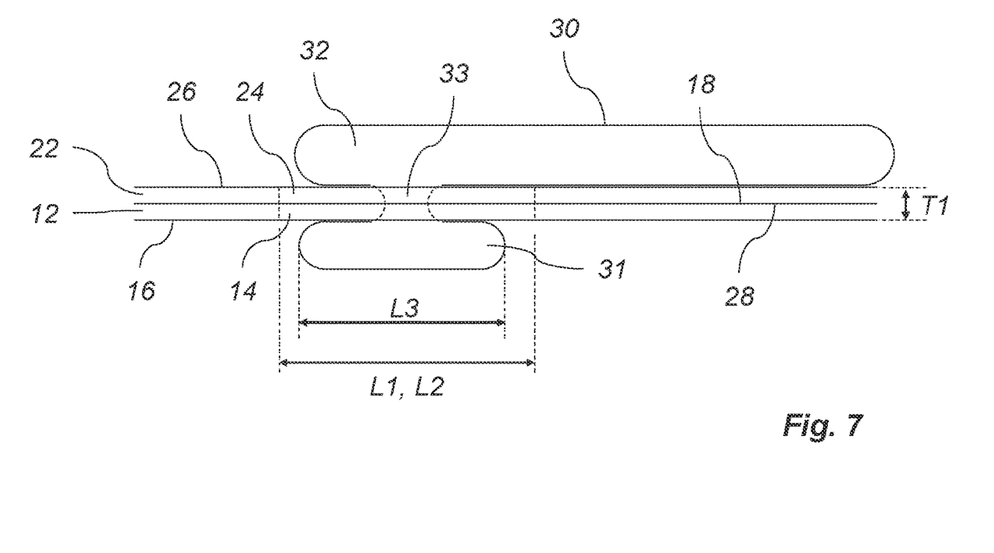
FIG. 7 shows a side view of a water barrier module system according to an embodiment of the invention.

As seen in e.g. FIG. 7, the first side flange 12 has an inner surface 16 and an outer surface 18. Further, the second side flange 22 has an inner surface 26 and an outer surface 28. When the two side flanges 12, 22 are arrange to each other to be fixed in position by means of the connection device 30, the two outer surfaces 18, 28 lies against each other and are in contact. In FIG. 7 the connection device 30 is illustrated in the inserting position.

When the connection device 30 is in the connecting position, the first portion 31 will abut the inner surface 16 of the first side flange 12. At the same time, the second portion 32 will abut the inner surface 26 of the second side flange 22. The two side flanges 12, 22 will thereby be clamped between the first and second portions 31, 32.

The combined thickness of the two side flanges 12, 22 is denoted T1. The distance between the first and second portions 31, 32 of the connection device 30 substantially correspond to the thickness T1. The distance between the first and second portions 31, 32 is provided by the intermediate portion 33 having the extension T3. The extension T3 of the intermediate portion 33 is substantially corresponding to the thickness T1 of the side flanges 12, 22.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A water barrier module system comprising
a first protective module and a second protective module configured to form at least a part of a water barrier to be positioned between a body of water and an area to be protected from water,
wherein each of the protective modules comprises a main plane and a first side along at least one side of the main plane,
wherein the first protective module comprises a first side flange along the first side of the first protective module, the first side flange extending substantially perpendicular to the main plane and having an outer surface and an inner surface,
wherein the second protective module comprises a second side flange along the first side of the second protective module, the second side flange extending substantially perpendicular to the main plane and having an outer surface and an inner surface,
wherein each of the first and second side flanges comprises at least one elongated opening having a width and a length, wherein the length is larger than the width,
the water barrier module system further comprising
a connection device configured to, in a connecting position, connect the first side flange to the second side flange by extending through the at least one elongated opening of both side flanges when the outer surfaces of the two side flanges are arranged to each other,
wherein the connection device comprises a first portion configured to, in the connecting position, abut the inner surface of the first side flange, a second portion configured to, in the connecting position, abut the inner surface of the second side flange, and an intermediate portion connecting the first portion and the second portion and configured to, in the connecting position, extend through the elongated openings,
wherein the first, second and intermediate portions of the connection device are formed in one integrated unit fixed relative to each other,
wherein the first portion of the connection device has a width that is smaller or equal to the width of the elongated openings and a length that is larger than the width of the elongated openings and smaller than or equal to the length of the elongated openings.

2. The water barrier module system according to claim 1, wherein the first portion and the second portion of the connection device extends in parallel.

3. The water barrier module system according to claim 1, wherein the first portion and the second portion of the connection device are separated by the intermediate portion providing a distance between the first and second portions being substantial equal to a combined thickness of the first and second side flanges.

4. The water barrier module system according to claim 1, wherein the second portion has a length that is larger than the width of the elongated openings.

5. The water barrier module system according to claim 1, wherein the length of the second portion is larger than the length of the elongated openings.

6. The water barrier module system according to claim 1, wherein the width of the second portion is smaller than the width of the elongated openings.

7. The water barrier module system according to claim 1, wherein the width of the second portion is larger than the width of the elongated openings.

8. The water barrier module system according claim 1, wherein the second protective module is an extension module extending the height of the water barrier.

9. The water barrier module system according claim 1, wherein the connection device is further configured to be moved into an inserting position by moving at least the first portion through the elongated openings, and to be moved from the inserting position to the connecting position to fix the first and second side flanges to each other.

10. The water barrier module system according claim 9, wherein the connection device is configured to be rotated to be moved from the inserting position to the connecting position.

11. The water barrier module system according claim 10, wherein the connection device is configured to be rotated 80-100 degrees from the inserting position to the connecting position.

12. The water barrier module system according to claim 1, wherein the first portion, the second portion and the intermediate portion of the connection device together have a uniform width.

13. The water barrier module system according to claim 1, wherein the connection device is formed of a sheet material, wherein the thickness of the sheet material provides the widths of the portions of the connection device.

* * * * *